United States Patent [19]

Dircks

[11] Patent Number: 5,135,057
[45] Date of Patent: Aug. 4, 1992

[54] AGRICULTURAL IMPLEMENT LIFTING MECHANISM

[76] Inventor: Robert A. Dircks, Carroll Gap, Somerton, New South Wales 2340, Australia

[21] Appl. No.: 551,892

[22] Filed: Jul. 12, 1990

[30] Foreign Application Priority Data

Jul. 13, 1989 [AU] Australia .................. PJ5248

[51] Int. Cl.⁵ .................................. A01B 73/04
[52] U.S. Cl. ......................... 172/456; 172/501; 172/776
[58] Field of Search ........... 172/126, 311, 414, 449, 172/456, 459, 501, 776; 74/104, 105

[56] References Cited

U.S. PATENT DOCUMENTS

| | | | |
|---|---|---|---|
| Re. 31,209 | 4/1983 | Anderson | 172/456 X |
| 3,209,839 | 10/1965 | Morkoski et al. | 172/414 X |
| 4,023,623 | 5/1977 | Anderson | 172/456 X |
| 4,116,282 | 9/1978 | Hansen | 172/311 |
| 4,441,562 | 4/1984 | Cooper | 172/456 X |
| 4,535,848 | 8/1985 | Pfenninger et al. | 172/456 X |
| 4,570,722 | 2/1986 | Osborn | 172/456 X |

*Primary Examiner*—Randolph A. Reese
*Assistant Examiner*—Jeffrey L. Thompson
*Attorney, Agent, or Firm*—Ladas & Parry

[57] ABSTRACT

A lifting apparatus for an agricultural implement, the apparatus includes first and second frame members, with the second frame member pivotally movable relative to the first member about a horizontal axis. To move the second member relative to the first member there is an actuator pivotally attached to the first member and a link pivotally attached to the second member and actuator. The second member has an abutment to engage the link to cause it to pivot with the second through a limited angle, after which the link disengages with the abutment to cause further pivoting of the second member.

8 Claims, 3 Drawing Sheets

5,135,057

AGRICULTURAL IMPLEMENT LIFTING MECHANISM

TECHNICAL FIELD

The present invention relates to lifting mechanisms and more particularly but not exclusively to lifting mechanisms associated with agricultural implements.

BACKGROUND ART

Many agricultural implements are relatively long or wide and needed to be folded or lifted to a more compact configuration for transport purposes so that the implement may be towed or moved along roads and paths through gateways. This is particularly evident in cultivating equipment such as harrows.

Agricultural implements employing lifting apparatus are described in U.S. Pat. Nos. 4,023,623; 4,116,282; 4,615,397; 4,328,869; and 4,355,690. The agricultural implements described in these specifications all employ hinged "winged frames" which are movable in a vertical plane extending generally transverse of the normal direction of movement of the implement. The winged frames are pivotted from a generally horizontally extending position to an upwardly extending position for transport purposes. U.S. Pat. No. 4,023,623 discloses a particularly relevant "winged hinged frame" and a hydraulic system for raising the frame. The implement described has a hydraulic cylinder pivotally mounted on the main frame. The winged frame is caused to pivot by the hydraulic cylinder applying a force to the winged frame via a linkage member which engages an abutment fixed to the main frame. The linkage member is pivotally attached to one end of the piston rod of the hydraulic cylinder, and is pivotally attached at its other end to the winged frame. The abutment engages the linkage intermediate its two pivot attachments. This particular device has the disadvantage that the linkage is subjected to considerable strain and would eventually fail due to the forces required to cause pivotting of the winged frame.

The lifting assemblies described in the above numbered U.S. patents include disadvantages in respect to the angle through which the "winged frame" may rotate. Their design generally inhibits rotation through an angle greater than 180°. Still further, the hydraulic cylinders are coupled to the winged frames in such a manner that they are operated during normal use of the agricultural implement. This causes undue wear and stress on the hydraulic system. That is the winged frame is not permitted to "float" freely to adjust to the land contour without movement of the hydraulic cylinder.

OBJECT OF THE INVENTION

It is the object of the present invention to overcome or substantially ameliorate the above disadvantages.

DISCLOSURE OF INVENTION

There is disclosed herein an apparatus comprising:
a first member;
a second member pivotally attached to said first member for pivotting movement relative thereto about a first pivot axis;
a link pivotally attached to said second member for pivotting movement relative thereto about a second pivot axis parallel to said first axis;
an actuator operatively extending between the first and second members to cause pivotting movement therebetween about said first axis, said actuator being attached to said link at a predetermined location, which location moves along an arcuate path about said second axis upon pivotting of said link relative to said second member; and an abutment means positioned along said path to limit the angle through which said link can pivot relative to said second member, said abutment being positioned angularly relative to said first and second pivots so that said link pivots with said second member in a predetermined direction through a first angle to cause pivotting of said second member until a predetermined angular position of said abutment means is reached whereat said link is permitted to pivot relative to said second member and to cause further pivotting of said second member about said first axis.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
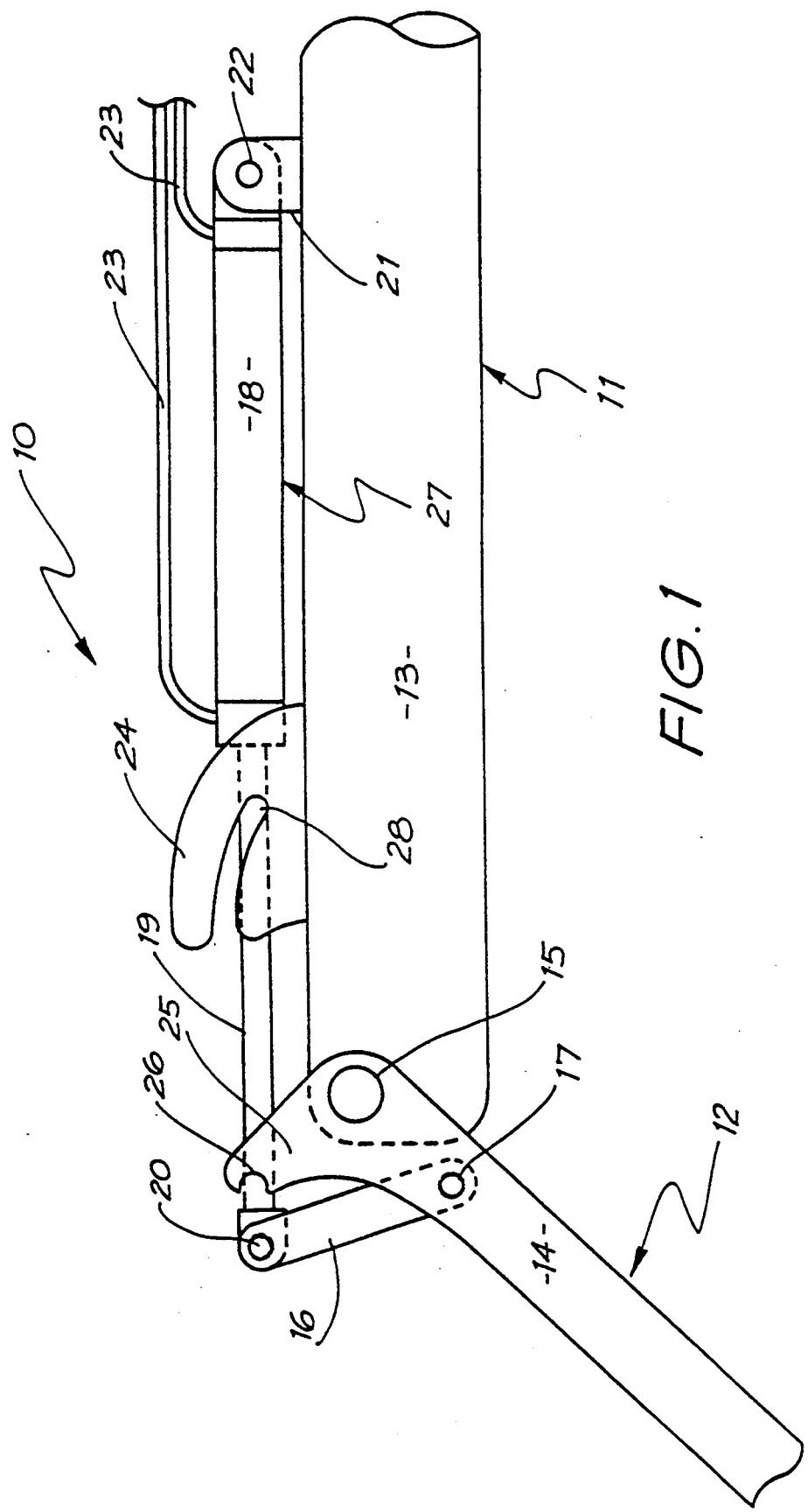
FIG. 1 is a schematic side elevation of a portion of an agricultural implement such as a cultivator.

In the accompanying drawings there is schematically depicted a portion of an agricultural implement 10, such as a cultivator. The implement 10 has a main frame 11 to which there is attached a sub-frame 12. The sub-frame 12 may be part of a hinged winged frame of the cultivator, while the main frame 11 could be the main body of the cultivator. As a particular example, the frames 11 and 12 could extend generally transverse of the normal direction of movement of the cultivator. For storage and transport purposes, it is desirable to be able to move the sub-frame 12 to a raised position reducing the effective width of the cultivator 10.

The main frame 11 includes a first member 13, to which there is attached a second member 14. The member 14 is pivotally attached to the member 13 via a pivot pin 15 which permits pivotting movement of the member 14 relative to the member 13 about a generally horizontal axis generally parallel to the normal direction of travel of the implement 10.

Pivotally attached to the member 14 is a link 16 via a pin 17. The pin 17 defines a second pivot axis, extending generally parallel to the axis of the pin 15.

Operatively extending between the link 16 and the member 13 is an actuator 27, which in this particular embodiment is a hydraulic ram. The actuator 27 has a main hollow body 18 which slidably receives a piston from which there extends a piston rod 19. The extremity of the piston rod 19 is pivotally attached to the link 16 by the pin 20. The pin 20 defines a third pivot axis, which is parallel to the pivot axes of the pins 15 and 17. The body 18 is pivotally attached to the member 13 by a clevis 21 and a pivot pin 22. Hydraulic lines 23 deliver hydraulic fluid under pressure to the opposite ends of the piston slidably received within the body 18.

Mounted on the member 13 is a retaining plate 24 which is provided with a slot 28 of arcuate configuration which receives a portion of the pin 20.

Formed integral with or extending from the member 14 is an abutment 25 which is provided with a recess 26 which also engages a portion of the pin 20. The recess 26 is located in the path of movement of the pin 20 about the second axis defined by the pin 17.

Figure 2:
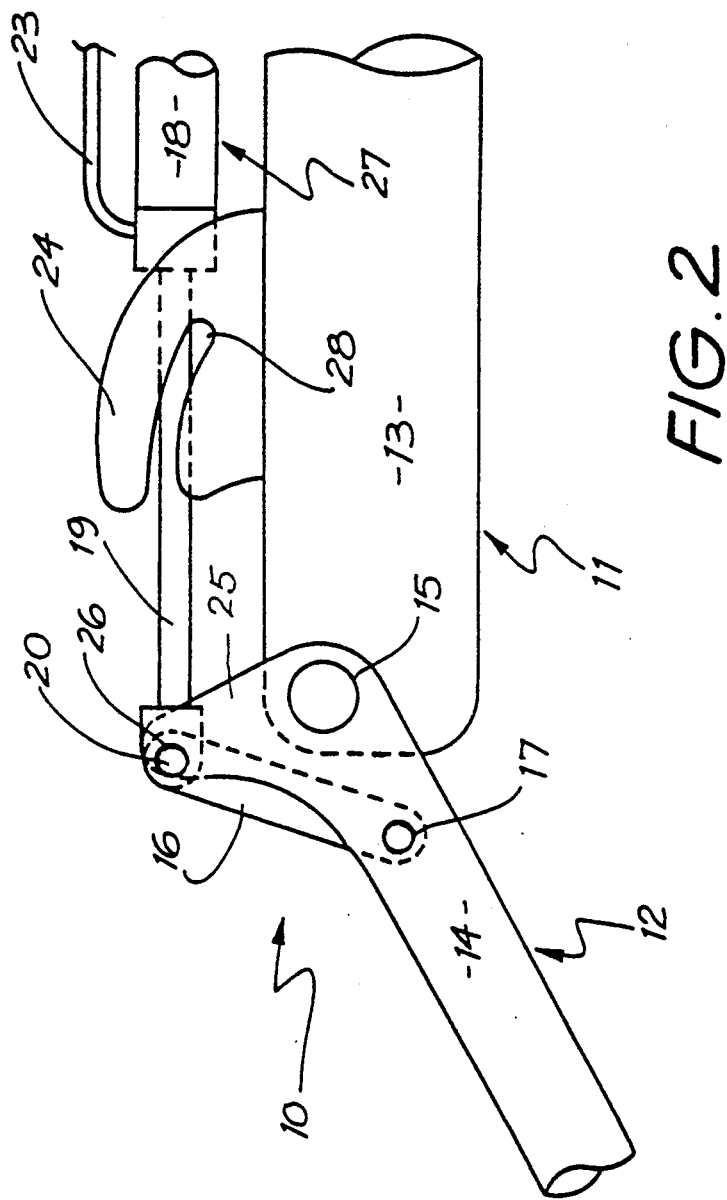
FIG. 2 is a schematic side elevation of the implement portion of FIG. 1 in a second operative position.

When the cultivator is in the configuration illustrated in FIG. 1, the actuator 27 is effectively isolated from the angular oscillations of the member 14 since the link 16 merely pivots to accommodate for movement of the member 14. If it is desired to cause pivotting movement of the member 14 in a clockwise direction about the first axis (defined by the pin 15) the actuator 27 is operated to cause retraction of the piston rod 19 into the body 18. This will cause pivotting of the link 16 and upon the link 16 passing through a predetermined angle, the pin 20 will engage in the recess 26. Thereafter, the force generated by the actuator 27 will cause pivotting of the member 14, as a force will be applied to the abutment 25. This particular mode of operation is illustrated in FIG. 2.

Figure 3:
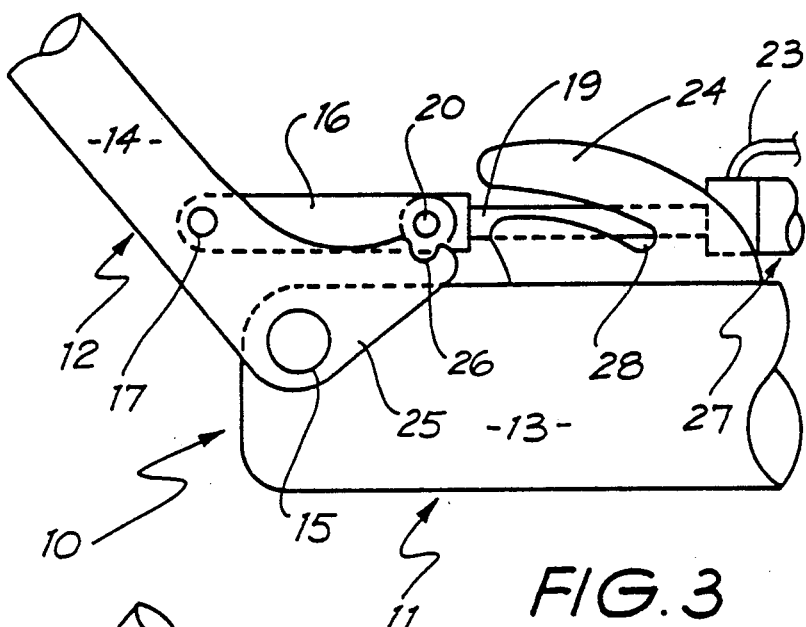
FIG. 3 is a schematic side elevation of the implement portion of FIG. 1 in a third operative position.
Figure 4:
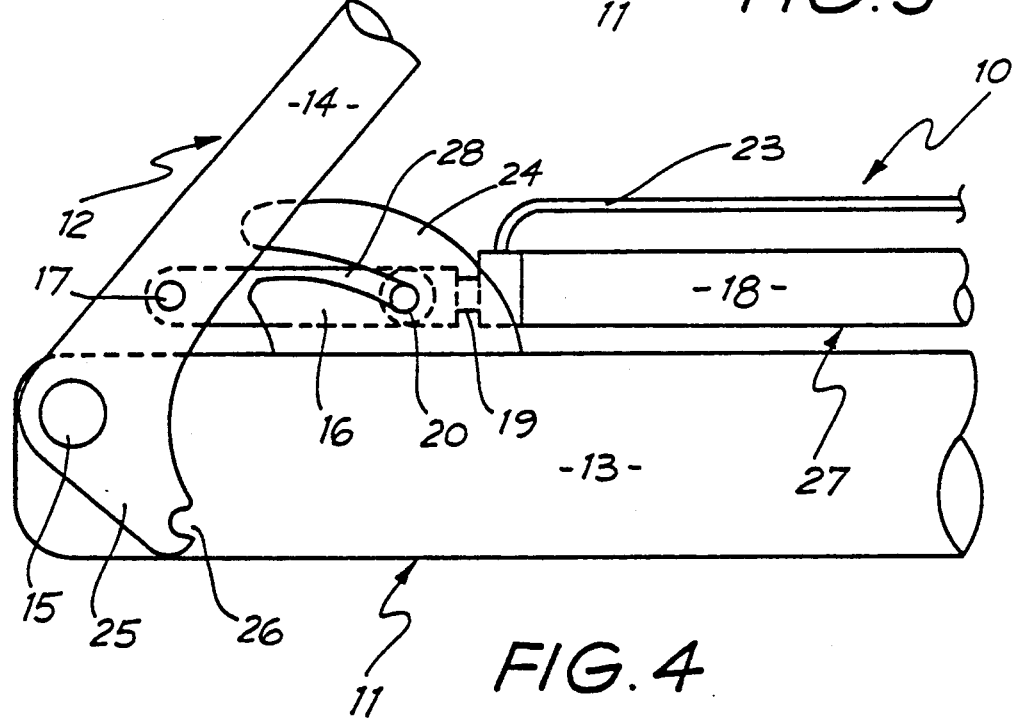
FIG. 4 is a schematic side elevation of the implement portion of FIG. 1 in a final operative position.

Once the member 14 has pivotted through a predetermined angle, the pin 20 will disengage from the recess 26, as best seen in FIG. 3. Continued retraction of the piston rod 19 will cause further pivotting of the member 14 due to the forces applied thereto via the link 16. Finally, the pin 20 will enter the slot 28 so that the member 14 is secured in position while minimising the forces applied to the actuator 17. The slot 28 also engages the pin 20 to restrain the link 16, together with the actuator 27, from buckling if the centre of gravity of the frame 12 passes the pivot 15 and exerts a compressive force on the link 16.

The above described preferred embodiment has the advantages that the member 14 can be moved through an angle greater than 180°, and the forces applied to the link 16 are tensional and compressional forces only. Still further, in the raised position the member 14 is securely held in position by the retaining plate 24. Still further, the member 14 can be effectively isolated from the actuator 27 as best illustrated in FIG. 1.

The above described embodiment has the further advantage of enabling the positioning of the pivot pins and configuration of the members and link to be arranged to provide a desired "moment" to be applied to the frame 12.

What I claim is:

1. An apparatus comprising:
   a first member;
   a second member pivotally attached to said first member for pivotting movement relative thereto about a first pivot axis;
   a link pivotally attached to said second member for pivotting movement relative thereto about a second pivot axis parallel to said first axis;
   an actuator operatively extending between the first and second members to cause pivotting movement therebetween about said first axis, said actuator being attached to said link at a predetermined location, which location moves along an arcuate path about said second axis upon pivotting of said link relative to said second member; and
   an abutment means positioned along said path to limit the angle through which said link can pivot relative to said second member, said abutment means being positioned angularly relative to said first and second pivots so that said link pivots with said second member in a predetermined direction through a first angle to cause pivotting of said second member until a predetermined angular position of said abutment means is reached whereat said link is permitted to pivot relative to said second member and to cause further pivotting of said second member about said first axis.

2. The apparatus of claim 1, wherein said link is pivotable relative to said second member through a predetermined angle to move said location along said path prior to engagement with said abutment means for movement with the second member through said first angle, and said second member has an elongated portion extending in a first direction generally radially from said first axis, and an abutment portion, having said abutment means, also extending generally radially from said first axis but spaced angularly from said elongated portion.

3. The apparatus of claim 2 further including a pivot pin pivotally attaching the actuator to said link for rotation about a third axis, and retaining means to secure said second member to said first member in a rest position with said link disengaged with said abutment means, said retaining means includes a slot to engage said pin.

4. An agricultural implement including the apparatus of claim 2, a main frame incorporating said first member, and a winged frame incorporating said second member, and wherein said actuator is pivotally attached to said first member.

5. The apparatus of claim 1 further including restraining means, engaging said link after said predetermined angular position is passed, defining a path along which said location moves to prevent buckling movement between said link and actuator.

6. The apparatus of claim 5 wherein said actuator is pivotally attached to said first member, and said restraining means includes a slot and a pivot pin, connecting said link and actuator, which engages in said slot to be guided thereby.

7. The apparatus of claim 1 further including a pivot means at said location, and wherein said abutment means includes a recess to receive the pivot means at said location.

8. The apparatus of claim 7 wherein said pivot means is a pin.

* * * * *